(12) United States Patent
Duscha et al.

(10) Patent No.: US 7,401,667 B2
(45) Date of Patent: Jul. 22, 2008

(54) MULTI-PURPOSE DRILLING TOOL

(75) Inventors: Helmut Duscha, Ravenburg (DE); August Haussmann, Ravenburg (DE)

(73) Assignee: Robert Bosch GmbH, Stuttgart (DE)

( * ) Notice: Subject to any disclaimer, the term of this patent is extended or adjusted under 35 U.S.C. 154(b) by 166 days.

(21) Appl. No.: 10/558,962

(22) PCT Filed: Nov. 12, 2004

(86) PCT No.: PCT/EP2004/052932

§ 371 (c)(1),
(2), (4) Date: Dec. 1, 2005

(87) PCT Pub. No.: WO2005/063427

PCT Pub. Date: Jul. 14, 2005

(65) Prior Publication Data

US 2006/0243495 A1    Nov. 2, 2006

(30) Foreign Application Priority Data

Dec. 23, 2003   (DE) ................. 103 61 065

(51) Int. Cl.
E21B 10/36   (2006.01)
(52) U.S. Cl. .................. 175/323; 175/415; 408/230

(58) Field of Classification Search ............... 175/323, 175/415, 420.1, 426; 408/230
See application file for complete search history.

(56) References Cited

U.S. PATENT DOCUMENTS

| 4,222,690 A | 9/1980 | Hosoi |
| 5,172,775 A | 12/1992 | Schairer et al. |
| 6,261,034 B1 * | 7/2001 | Cselle ............... 408/230 |
| 2002/0054799 A1 | 5/2002 | Anjanappa et al. |
| 2003/0000745 A1 | 1/2003 | Huber |
| 2005/0103532 A1 | 5/2005 | Magin |

FOREIGN PATENT DOCUMENTS

| DE | 31 23 048 | 8/1882 |
| EP | 0 427 857 | 5/1991 |
| WO | 03/051565 | 6/2003 |

* cited by examiner

*Primary Examiner*—William P Neuder
(74) *Attorney, Agent, or Firm*—Michael J. Striker (57) ABSTRACT

The present invention relates to a multi-purpose drilling tool with a boring head, a drill twist connected thereto and a downstream clamping shank, a cutting element (1) being provided on the working side of the boring head. The cutting element (1) has a face (9, 24) with a rake angle ($\gamma$) having a value of $\gamma \geqq 0°$ b, the cutting element (1) having a flank (10, 13) with a lip clearance angle ($\alpha$) having a value of $5° \leqq \alpha \leqq 15°$ and, in particular, $\alpha \approx 10°$.

13 Claims, 8 Drawing Sheets

MULTI-PURPOSE DRILLING TOOL

STATEMENT REGARDING FEDERALLY SPONSORED RESEARCH OR DEVELOPMENT

Not applicable

INCORPORATION BY REFERENCE OF MATERIAL SUBMITTED ON A COMPACT DISC

Not Applicable

CROSS-REFERENCE TO RELATED APPLICATIONS

Not Applicable

BACKGROUND OF THE INVENTION

1. Field of the Invention

The present invention relates to a multi-purpose drilling tool.

2. Description of the Related Art

Publication DE 31 23 048 A1 makes known a universal drill that includes a boring head with a hard-metal plate, a shank attached thereto, and a clamping shank. The universal drill is designed for machining hard and slightly hard materials; percussive motion must not take place during drilling. The disadvantage of this type of drill is that, although it is suited for machining concrete, masonry and similar hard materials, the fact that it is limited to rotary operation means the rapid progress typically made in machining these types of materials does not occur, with the result that the acceptance of a drill of this type among professional users is low.

Furthermore, publication U.S. Pat. No. 5,172,775 makes known a drill with a drill bit insert that is also designed exclusively for a rotary application.

BRIEF SUMMARY OF THE INVENTION

The object of the present invention is to provide a multi-purpose drilling tool that is suited for use in the rotating drilling mode to machine, via chip-removal, materials such as wood, metal and plastic, and impact-sensitive materials such as tiles and roofing tiles, and for use in the rotary-impacting drilling mode to drill concrete, stone and bricks.

This object is attained, according to the present invention, based on the features of the definition of the species in claim 1 by the characterizing features of claim 1. Advantageous further developments are stated in the subclaims.

The present invention is based on the basic idea of achieving a symbiosis between a drill designed exclusively for rotary application and a drill designed for a rotary-impacting application to provide the craftsman with a tool that reduces the number of drill bit changes and the number of drill bits one must have on hand, thereby saving working time that is lost when drill bits must be replaced, located or identified. The multi-purpose drilling tool according to the present invention has a cutting element with faces, flanks and cutting edges, a rake angle ($\gamma$) with $\gamma \geq 0°$ being provided for at least one part of the face, and a lip clearance angle ($\alpha$) of $5° \leq \alpha \leq 15°$ and, in particular, $\alpha \approx 10°$, being provided. A drill of this type for universal application is optimally designed for machining the most diverse types of materials in the rotary and rotary-impacting mode, since the selected rake angle is also suitable for use to machine long-chipping materials, and since the large wedge angle makes the cutting lip adequately stable for impacting work. Rake angles ($\gamma$) of $0°$ to $10°$ are provided in particular.

In addition, according to the present invention, the cutting edge is oriented toward a longitudinal drill bit axis. The convergent profile of the cutting edges results in the required centering of the multi-purpose drilling tool for pilot drilling and during the drilling operation itself. At the same time, the slender design in the region of the longitudinal drill bit axis makes it easier for the multi-purpose drilling tool to penetrate the material.

According to the present invention, it is also provided to vary the profile of the cutting edge in the direction of the longitudinal drill bit axis by superposing on it a curved and/or arched and/or zigzag profile. As a result, it is possible to influence the geometry of the flank that also serves as the striking surface and to design it optimally for the loads to be incurred.

The present invention further provides a point angle ($\beta$) of $110°$ to $130°$ and preferably approximately $\beta=120°$, which is formed by the cutting edges. With a point angle of this type, it is possible to perform clean pilot drilling with the drill bit tip while keeping the resultant radial forces low.

According to the present invention, it is provided to allow the cutting edges to transition into each other via a chisel edge. As a result, low susceptibility to wear of the hard-metal plate in the region of the longitudinal drill bit axis is ensured during rotary-impacting operation in particular, since the flanks of the chisel edge approximately form a point angle that corresponds to the point angle of the cutting lips.

According to an embodiment of the present invention, it is provided to allow the cutting edges to transition into each other without forming a chisel edge. A cutting point of this type enables, in particular, highly-exact pilot drilling when the tool is operated in the drilling mode. When the material for the cutting element is selected accordingly, adequate stability is still ensured during rotary-impacting operation when the intended point angle is used.

In addition, according to the present invention, the face is positioned with a slight slant relative to a longitudinal mid-plane, and the face is allowed to transition into the lateral surface via a transition surface configured in the shape of a channel. As a result, it is possible to design the cutting element based on simple, basic geometry and to easily create the desired profile of the face and the cutting edge.

According to the present invention, the lateral surface and the face meet at a straight transition edge, the transition edge being oriented parallel with a longitudinal axis of the multi-purpose drilling tool or extending at an acute angle with this longitudinal axis. The ratio of the size of the lateral surface to the face can be influenced by the different profiles. In particular, by using an inclined profile of the transition edge, it is possible to push chips or drill cuttings produced in the region of the drill bit tip radially outwardly on the path along the longitudinal drill bit axis with the aid of the channel produced via this profile.

According to the present invention, the cutting edge is extended past the chisel edge and/or the punctiform cutting point, this extension transitioning into the lateral surface on the other side of a transversal mid-plane and having an arched shape in particular.

According to the present invention, the face is configured as a flat surface that has a uniform rake angle $\gamma$. As a result, it is possible to design the geometry of the drill bit insert required for the multi-purpose drilling tool in a particularly easy manner and to forego a cost-intensive, complex shaping procedure.

Finally, according to one embodiment of the present invention, the face is formed by at least two flat partial surfaces that have different rake angles, a first partial surface with a rake angle $\gamma \geqq 0°$ being provided in a radially outwardly located region of the drill bit insert of the multi-purpose drilling tool and, a second partial surface being provided in a region located directly around the longitudinal mid-axis of the multi-purpose drilling tool, the second partial surface having a negative rake angle $\gamma<0°$. As a result, it is possible to realize a face with a rake angle $\geqq 0°$ in a radially outwardly located region of the drill bit insert and still design a short chisel edge or a point without having to forgo the stable design of the drill bit insert.

BRIEF DESCRIPTION OF THE SEVERAL VIEWS OF THE DRAWINGS

Further details of the present invention are described in the drawing with reference to schematically depicted exemplary embodiments.

DETAILED DESCRIPTION OF THE INVENTION

Figure 1:
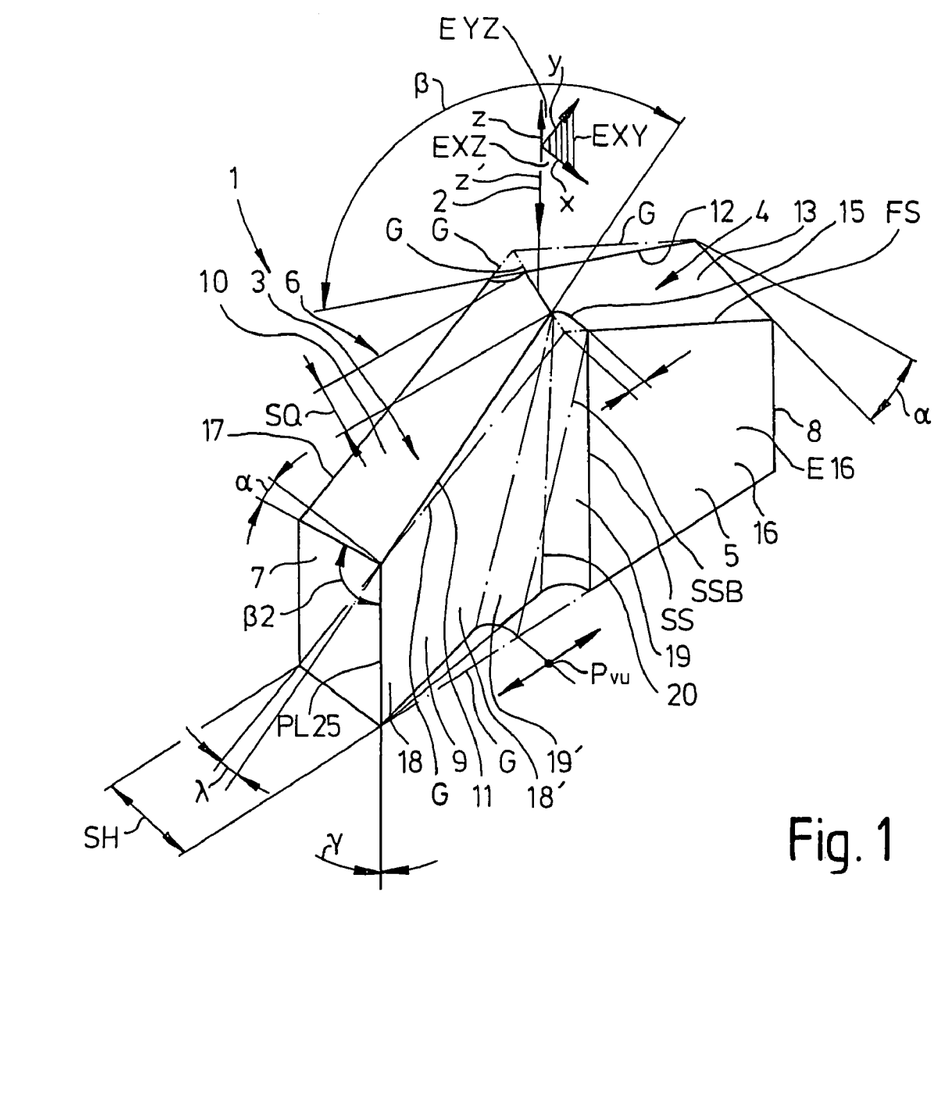
FIG. 1 Shows a perspective side view of a cutting element of a not-shown multi-purpose drilling tool, FIG. 2a Shows a side view of a further cutting element of a further not-shown multi-purpose drilling tool, FIG. 2b Shows an underside view of the cutting element shown in FIG. 2a, FIG. 2c Shows a further side view of the cutting element shown in FIG. 2a, FIG. 2d Shows a top view of the cutting element shown in FIG. 2a, FIG. 3a Shows a side view of a multi-purpose drilling tool according to the present invention, FIG. 3b Shows a top view of the multi-purpose drilling tool shown in FIG. 4a, FIG. 3c Shows an enlarged detained view of the multi-purpose drilling tool shown in FIG. 4a, FIG. 3d Shows a view of the depiction in FIG. 4c, from an arrow direction IVd, FIGS. 4a-4c Show an embodiment of a drill bit insert with a shortened chisel edge, in three views, FIGS. 5a-5c Show a further embodiment of a drill bit insert without a chisel edge, in three views, and FIGS. 6a-6d Show eight embodiments of the profile of the cutting edges.

A perspective side view of a cutting element 1 of a not-shown multi-purpose drilling tool is shown in FIG. 1. Cutting element 1 is embedded in a not-shown boring head that transitions into a not-shown drill twist which, in turn, transitions into a not-shown clamping shank. The clamping shank can be designed cylindrical in shape or as a system insertion end and, in particular, as an "SDS-Plus clamping shank" or the like, and enables, in particular, both rotary and rotary-impacting operation of the multi-purpose drilling tool.

Cutting element 1 is formed essentially by two cutting lips 3 and 4 located centrosymmetrically to a longitudinal drill bit axis 2. The description below is limited largely to cutting lip 3, with cutting lip 4 having the same configuration. Cutting element 1 is limited laterally by two longitudinal sides 5, 6 and two transverse sides 7, 8. Cutting lip 3 is formed essentially by a face 9 which forms a part of longitudinal side 5, and a flank 10, face 9 and flank 10 transitioning into each other at a cutting edge 11. Face 9 has a rake angle $\gamma=0°$ with a parallel line PL or a leading edge 25 that extends parallel to longitudinal axis 2. Flank 10 has a lip clearance angle $\alpha=10°$ with a plane EXY positioned perpendicularly to longitudinal axis 2. This results in a wedge angle $\beta 2=80°$ enclosed between face 9 and flank 10 which provides a high level of stability to cutting lip 3 against striking from a direction z', because cutting edge 11 is still supported in an optimal manner despite the fact that a negative rake angle—which is typical with cutting elements used for impact drilling—is not present. Cutting edges 11 and 12 enclose a point angle $\beta=118°$. Flanks 10, 13 of cutting lips 3 and 4 meet at a chisel edge 14, which also joins cutting edges 11 and 12. Chisel edge 14 is divided in the middle by longitudinal drill bit axis 2. Cutting edge 11 also has an extension 15 with which it is extended, with an arched shape, past chisel edge 14 into the region of cutting lip 4 to a lateral surface 16 and meets two edges, namely an edge FS formed by flank 13 and lateral surface 16, and edge SS formed by lateral surface 16, face 9 and a transition surface 19 located between the two. Due to the profile of cutting edge 11 and its extension 15, longitudinal side 5 formed by aforementioned surfaces 9, 16 and 19 is not configured as a plane, since face 9 recedes relative to a plane E16 defined by lateral surface 16. Cutting edge 11 and face 9 extend toward plane E16 at a taper angle $\lambda=7°$. This means cutting element 1 tapers from a width SH to a width SQ from transverse side 7 toward longitudinal drill bit axis 2 in the region of cutting lip 3. The ratio of SH to SQ is in the range of $0.25 \times SH \leqq SQ \leqq 0.9 \times SH$, and it is provided in particular that width SH tapers to $SQ=0.5 \times SH$. A lateral surface 17 extends parallel to a longitudinal mid-plane EYZ, and cutting edge 11 extends toward longitudinal mid-plane EYZ or longitudinal drill bit axis 2 at a taper angle $\lambda$. According to a not-shown embodiment, it is provided that lateral surface 17 also extends toward longitudinal drill bit axis 2.

The dashed lines labelled "G" outline a simple geometric body, out of which cutting element 1 is formed, e.g., via chip-removing machining.

An embodiment of the profile of edge SS is depicted using edge SSB indicated by the dashed-dotted line. Edge SS, which defines the transition between lateral surface 16 and face 9 extends parallel to longitudinal drill bit axis 2. Face 9 forms a planar surface 18 and transitions into lateral surface 16 via a transition surface 19 which is concave for the distance of nearly a quadrant and extends parallel to edge SS. Planar surface 18 and transition surface 19 meet at an edge 20. In contrast, edge SSB extends with an incline relative to longitudinal drill bit axis 2. This results in a planar surface 18' having a smaller surface area and a transition surface configured in the shape of a channel 19' which also extends at an angle. Due to the reduction in size of planar surface 18' formed by face 9, an enlarged lateral surface 16 results. According to a not-shown embodiment, curved profiles of edge SSB are also provided, edge SSB preferably extending in plane E16 of lateral surface 16. A transverse mid-plane EXZ extends through the longitudinal drill bit axis perpendicularly to longitudinal mid-plane EYZ.

Figure 2A:
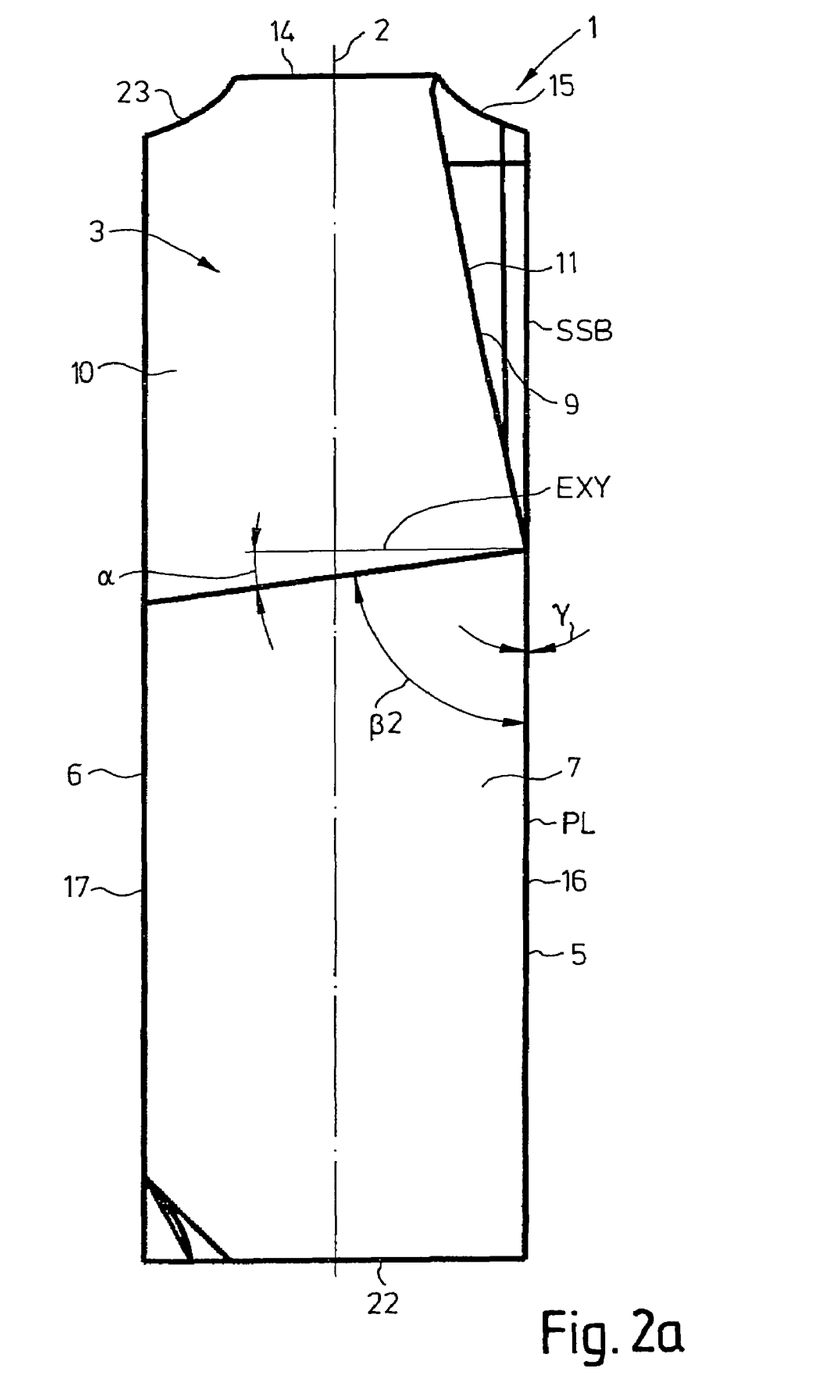

A side view of a transverse side 7 of a hard-metal drill bit insert 1 of a not-shown multi-purpose drilling tool is shown in FIG. 2a. Hard-metal drill bit insert 1 is limited by an underside 22 and longitudinal sides 5, 6 with lateral sides 16, 17. Transverse side 7 transitions into a flank 10 which rises toward a chisel edge 14. A cutting edge 11 follows the same course. Where cutting edge 11 meets chisel edge 14, it transitions into an extension 15 and, together with extension 15 and an edge SSB, limits a face 9. An extension 23 of a second cutting edge 12 (FIG. 2c) is shown to the left of a longitudinal drill bit axis 2, extension 23 extending toward a lateral surface 17. Also shown in FIG. 2a are the main angles of a cutting lip 3 formed by flank 10, face 9 and cutting edge 11. The angles are a rake angle γ=0° between a line PL which is parallel to longitudinal drill bit axis 2 and face 9, a lip clearance angle α=10° between a plane EXY extending perpendicularly to longitudinal drill bit axis 2 and flank 10, and a wedge angle β2=80° enclosed by face 9 and flank 10.

Figures 2B, 2C:
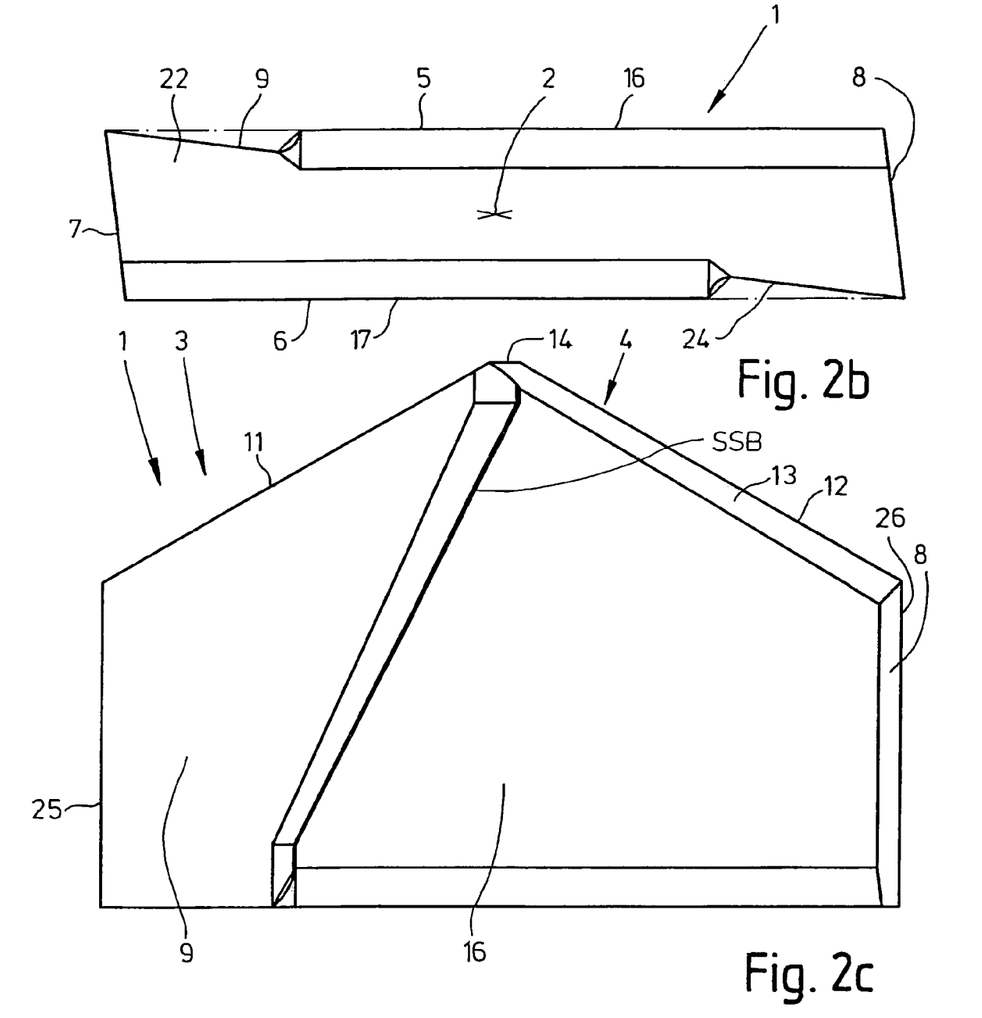

FIG. 2b shows a top view of underside 22 of cutting element 1. Extensions of lateral surfaces 16 and 17 are indicated with dashed lines which show that faces 9 and 24 are oriented toward longitudinal drill bit axis 2.

FIG. 2c shows a view of longitudinal side 6 of cutting element 1 shown in FIGS. 2a and 2b. Edge SSB, where lateral surface 16 transitions into face 9 has a profile that approximately corresponds to that of edge SSB in FIG. 1. Lateral surface 16 expands into the region of cutting lip 3. A flank 13, a cutting edge 12 and a leading edge 26 of a second cutting lip 4 are shown. Of cutting lip 3, only cutting edge 11, face 9 and a leading edge 25 can be seen.

Figure 2D:
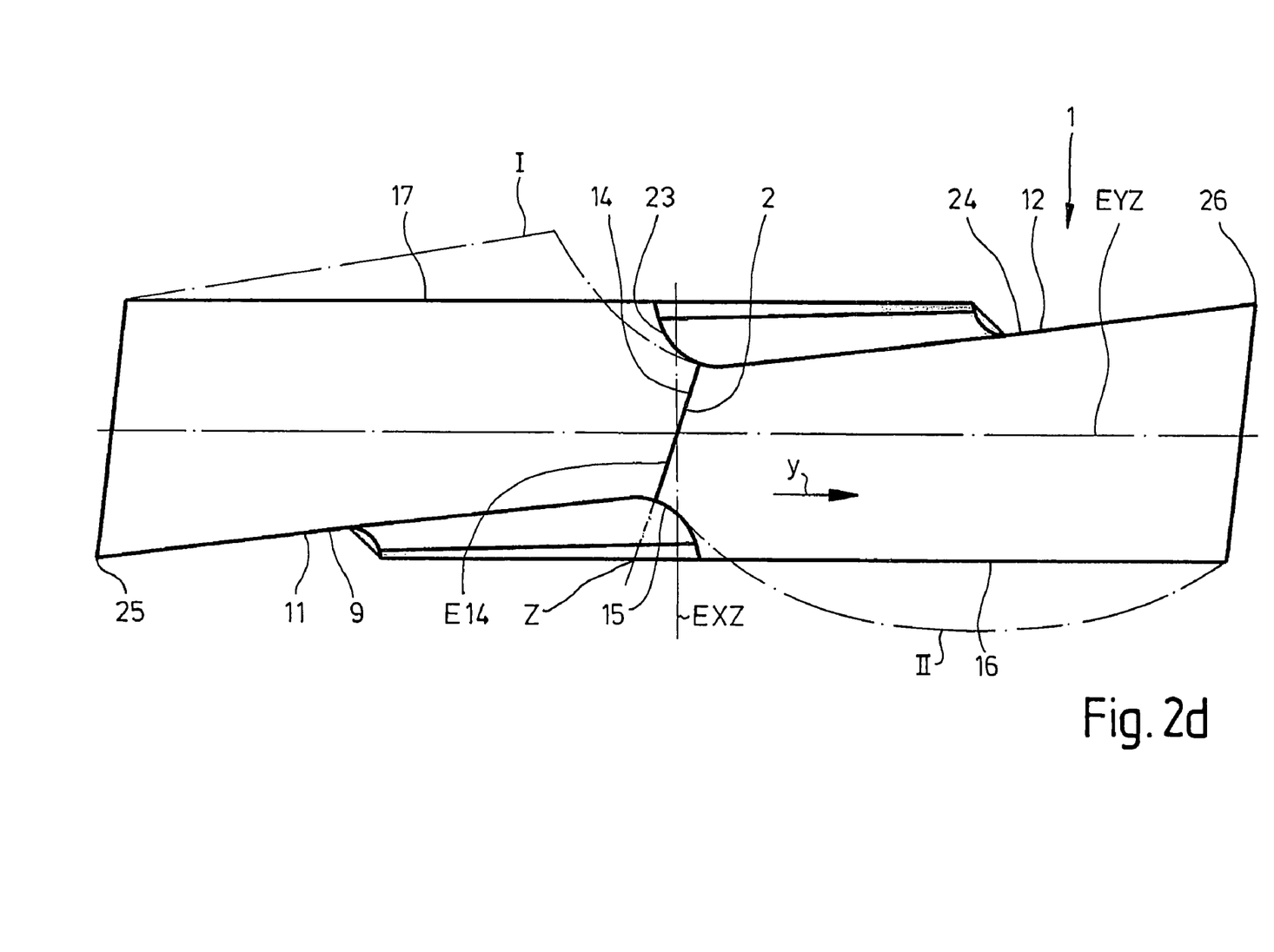

FIG. 2d shows a top view of cutting element 1 shown in FIG. 2c. As is the case with FIG. 1, a longitudinal mid-plane EYZ and a transversal mid-plane EXZ are also shown here. Lateral surfaces 16, 17 extend parallel to longitudinal mid-plane EYZ, and cutting edges 11, 12 and faces 9, 24 extend toward longitudinal mid-plane EYZ. An extension 15 of cutting edge 9 extends past transversal mid-plane EXZ to lateral surface 16 and is therefore located in the y-direction on the other side of an intersection Z which is an imaginary extension of chisel edge 14 with lateral surface 16. This also applies, in an analogous manner, for an extension of cutting edge 12. In other words, chisel edge 14 defines a plane E14 positioned perpendicularly in the plane of the drawing. With regard for cutting edges 11 and 12, they transition into lateral surfaces 16 and 17 on the other side of plane E14. Leading edges 25, 26 have the greatest radial distance from the longitudinal drill bit axis. FIG. 2d also shows, with configurations 1 and 11, two different variations of an alternative design of the lateral surfaces which also result in a relatively short chisel edge 14 with a good centering effect.

Figures 3A, 3B:
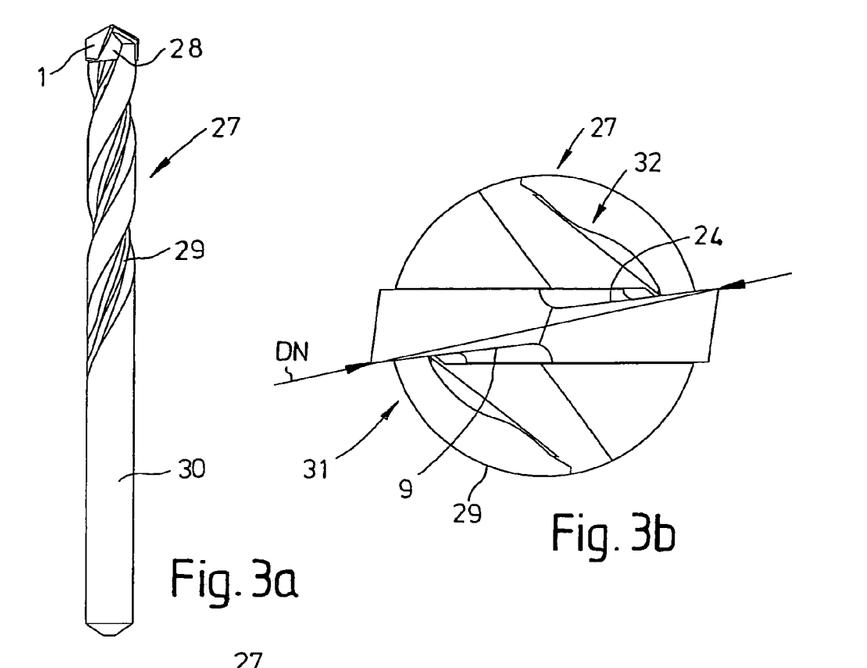

FIG. 3a shows a side view of a multi-purpose drilling tool 27 with a boring head 28 that supports a cutting element 1 and transitions into a drill twist 29. The drill twist transitions into a clamping shank 30.

FIG. 3b shows a top view of multi-purpose drilling tool 27 shown in FIG. 3a. Drill bit insert 1 defines a nominal diameter DN. Faces 9, 24 transition into flutes 31 and 32 in drill twist 29.

Figure 3C:
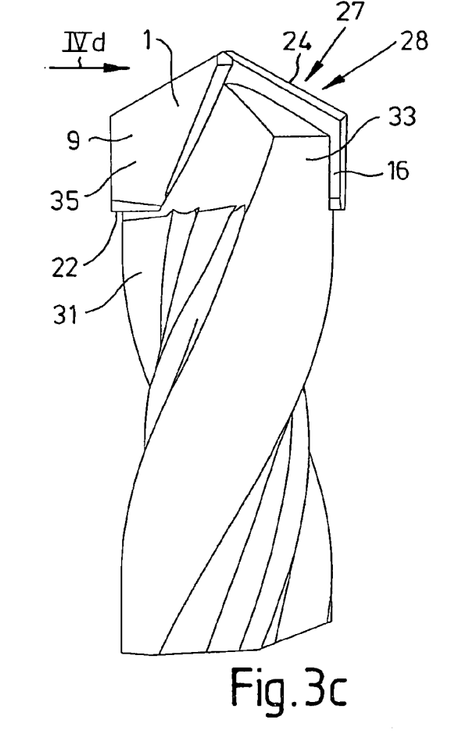

FIG. 3c shows a detained view of multi-purpose drilling tool 27 shown in FIG. 3a. Boring head 28 is composed of two prolongations 33, 34 of drill twist 29 (refer also to FIG. 3d) which hold cutting element 1 in the region of lateral surfaces 16, 17. Faces 9 and 24 are not covered by prolongations 33 and 34 in a lower region 35 close to an underside 22 of multi-purpose drilling tool 1, either, and they transition directly into flutes 31 and 32. As a result, there is an unobstructed path along which chips and/or drill cuttings can be carried away.

Figure 3D:
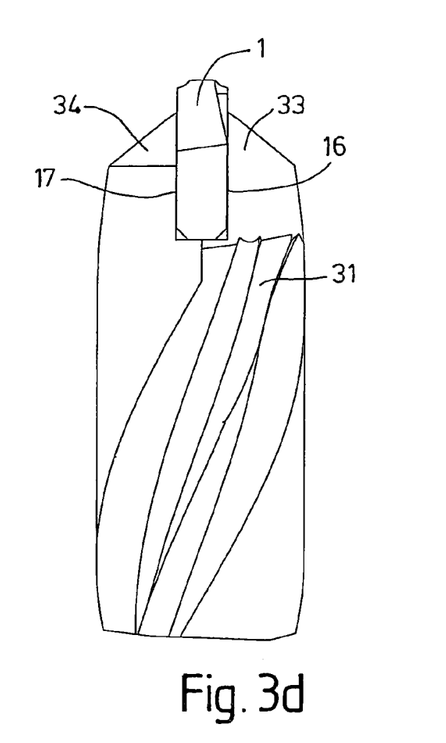

FIG. 3d shows the detained view shown in FIG. 3c in a view rotated by 90°. The lateral embedding of cutting element 1 between projections formed by prolongations 33, 34 is also shown in this view.

Figure 4A:
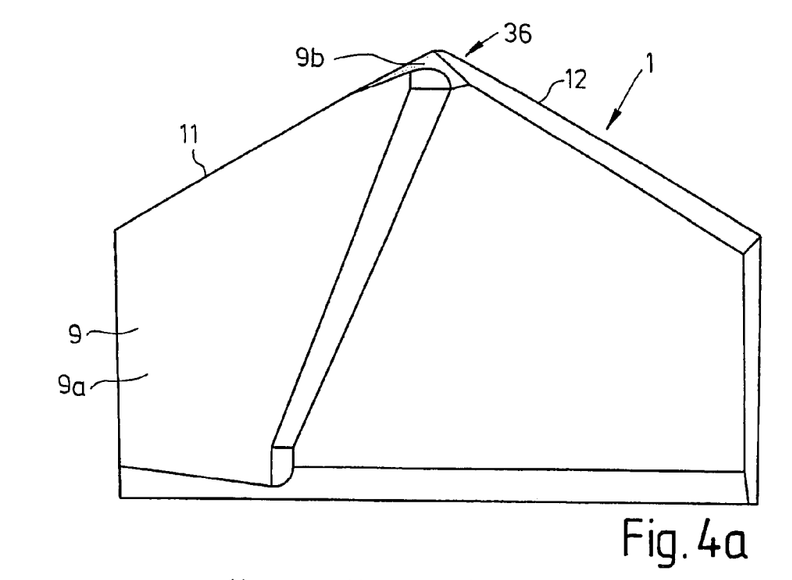
Figure 4B:
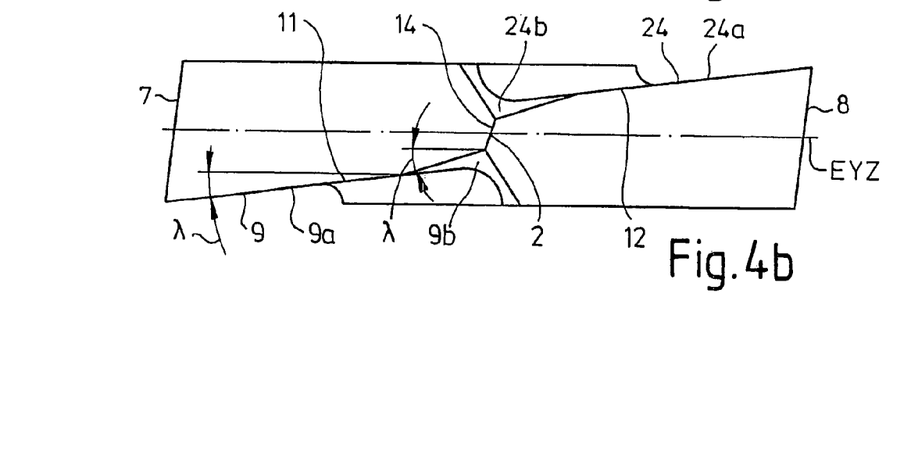
Figure 4C:
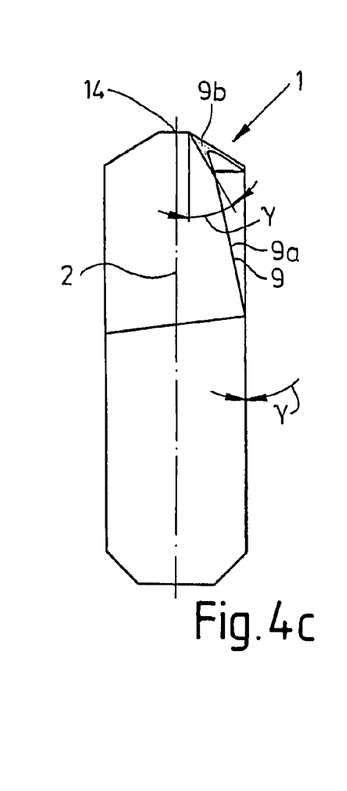

FIGS. 4a through 4c show an embodiment of a drill bit insert 1 with a shortened chisel edge 14, in three views. It is designed largely similar to the drill bit inserts shown in the preceding Figures. Chisel edge 14 is shortened as compared with the drill bit insert shown in FIGS. 2a through 2d. This shortening of chisel edge 14 is formed via a polished face in the region of a drill tip 36. The polished face subdivides a face 9 and 24 into two partial faces 9a, 9b and 24a, 24b. First partial faces 9a, 24a form a much larger surface than the two partial surfaces 9b, 24b configured in the region of drill tip 36. The first partial surfaces 9a, 24a have a rake angle γ=0°, and the second partial surfaces 9b, 24b have a negative rake angle γ≈35°. Subdividing faces 9 and 24 into two planar partial surfaces 9a, 9b and 24a, 24b with different rake angles also results in a polygonal profile of cutting edge 11 and 12. This means, a taper angle λ of cutting edge 12 of a longitudinal mid-plane EYZ increases abruptly toward a longitudinal drill bit axis 2, from λ≈7° to λ≈18°.

Figures 5A, 5B, 5C:
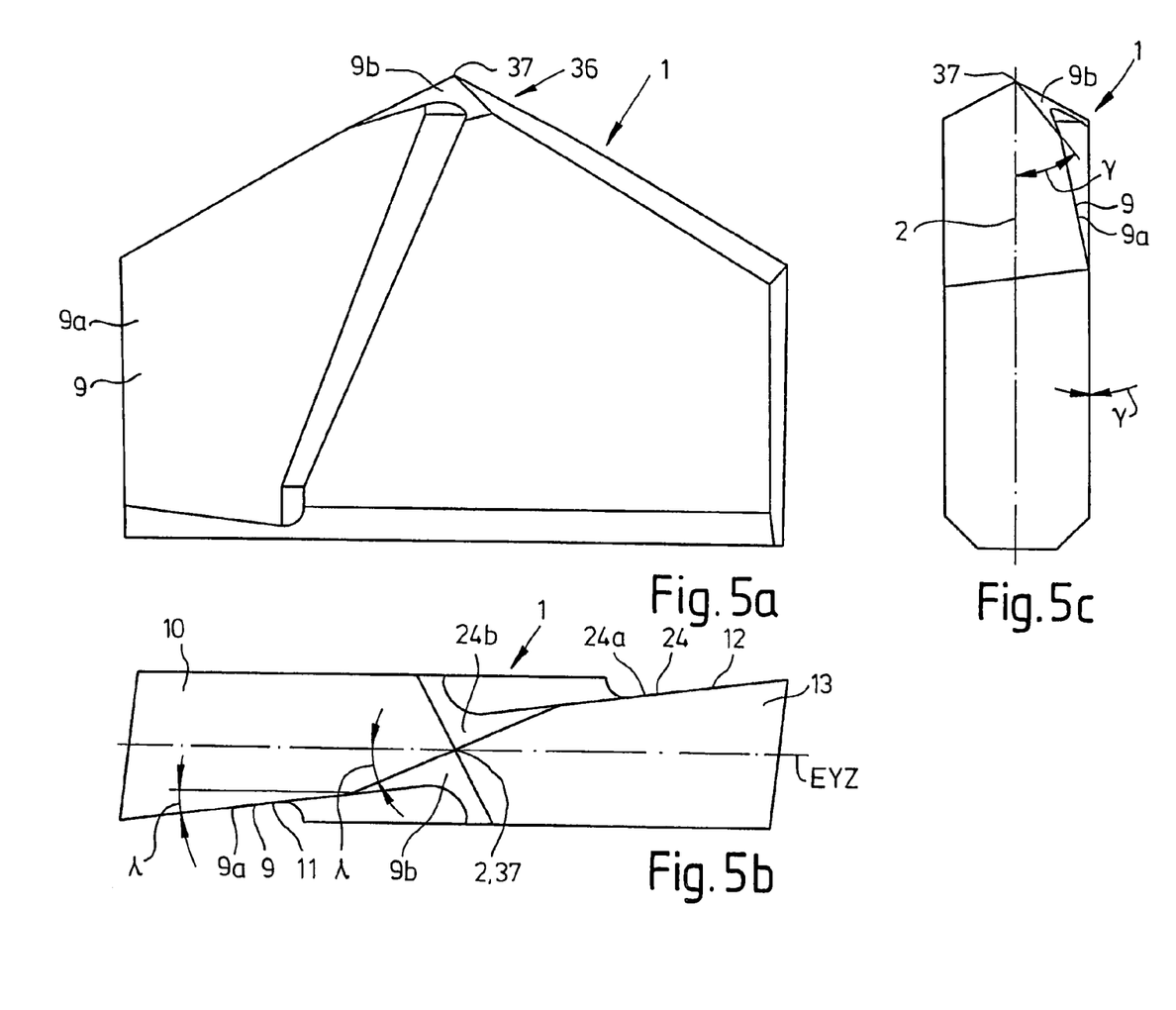

FIGS. 5a through 5c show a further embodiment of a drill bit insert 1, in three views. It is designed largely analogously to the drill bit inserts shown in the preceding Figures, but it does not have a chisel edge. It has a point 37 instead, at which flanks 10, 13 and faces 9, 24 meet to form a point. Tip 37 is formed via a polished face in the region of a drill tip 36. The polished face subdivides a face 9 and 24 into two partial faces 9a, 9b and 24a, 24b. First partial faces 9a, 24a form a much larger surface than the two partial surfaces 9b, 24b configured in the region of drill tip 36. The first partial surfaces 9a, 24a have a rake angle γ=0°, and the second partial surfaces 9b, 24b have a negative rake angle γ≈40°. Subdividing faces 9 and 24 into two planar partial surfaces 9a, 9b and 24a, 24b with different rake angles γ also results in a polygonal profile of cutting edge 11 and 12. This means, a taper angle λ of cutting edge 12 of a longitudinal mid-plane EYZ increases abruptly toward a longitudinal drill bit axis 2, from λ≈7° to λ≈23°.

FIGS. 6a through 6d show eight embodiments of the profile of a cutting edge 11 and 12 in a top view of cutting elements. The embodiments are indicated in depictions as shown in FIG. 2d.

Figure 6A:
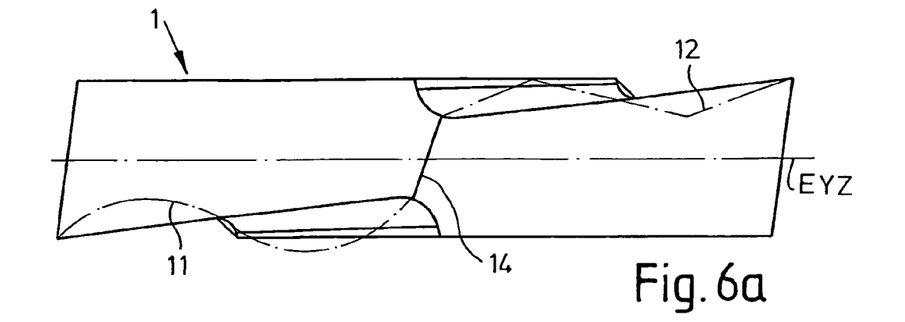

FIG. 6a shows a cutting edge 11 on a cutting element 1, cutting edge 11 extending toward a chisel edge 14 in a sinusoidal manner and initially approaching a longitudinal mid-plane EYZ in a radially outwardly located region of cutting element 1. FIG. 6a also shows a cutting edge 12 that extends toward chisel edge 14 with a zigzag pattern, cutting edge 12 initially approaching longitudinal mid-plane EYZ in a radially outwardly located region of cutting element 1.

Figure 6B:
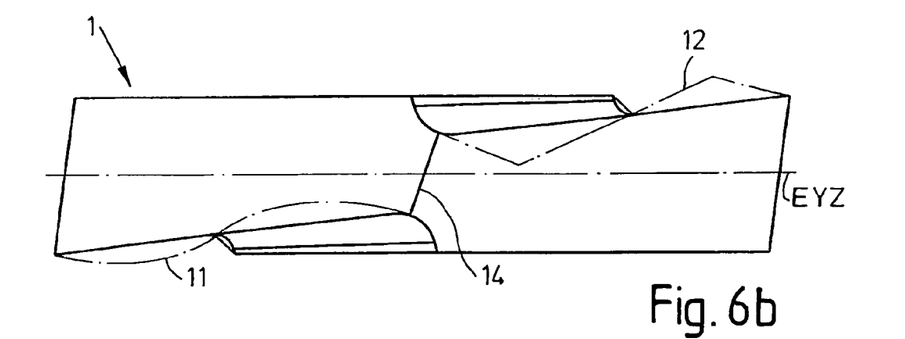

FIG. 6b shows a cutting edge 11 on a cutting element 1, cutting edge 11 extending toward a chisel edge 14 in a sinusoidal manner and initially moving away from a longitudinal mid-plane EYZ in a radially outwardly located region of cutting element 1. FIG. 6b also shows a cutting edge 12 that extends toward chisel edge 14 with a zigzag pattern, cutting edge 12 initially moving away from longitudinal mid-plane EYZ in a radially outwardly located region of cutting element 1.

Figure 6C:
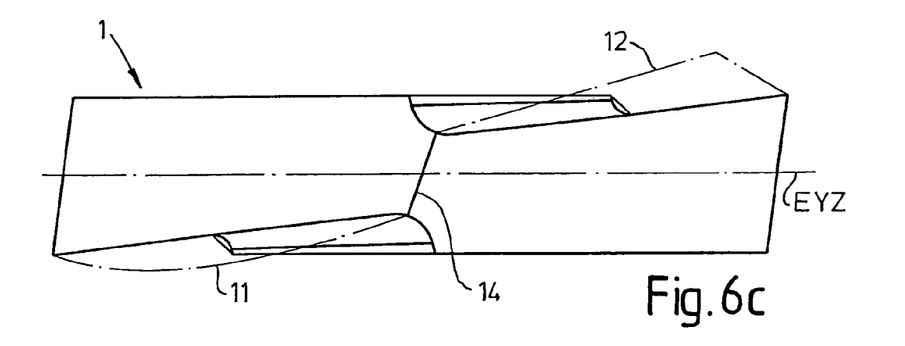

FIG. 6c shows a cutting edge 11 on a cutting element 1, cutting edge 11 extending toward a chisel edge 14 in an arched manner and initially moving away from a longitudinal mid-plane EYZ in a radially outwardly located region of cutting element 1. FIG. 6c also shows a cutting edge 12 that extends toward chisel edge 14 with an angled pattern, cutting edge 12 initially moving away from longitudinal mid-plane EYZ in a radially outwardly located region of cutting element 1.

Figure 6D:
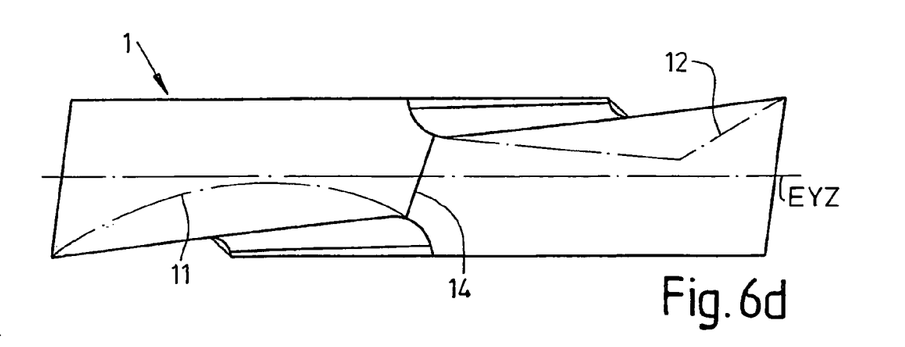

FIG. 6d shows a cutting edge 11 on a cutting element 1, cutting edge 11 extending toward a chisel edge 14 in an arched manner and initially approaching a longitudinal mid-plane EYZ in a radially outwardly located region of cutting element 1. FIG. 6d also shows a cutting edge 12 that extends toward chisel edge 14 with an angled pattern, cutting edge 12 initially approaching longitudinal mid-plane EYZ in a radially outwardly located region of cutting element 1.

The present invention is not limited to the exemplary embodiments shown or described. Rather, it includes further developments of the present invention within the scope of patent claims. Feasible materials for the cutting element include, in particular, hard metal, PKD or ceramic.

REFERENCE NUMERALS

1 Cutting element
2 Longitudinal drill bit axis
3, 4 Cutting lip
5, 6 Longitudinal side
7, 8 Transverse side
9 Face of 3
9a, 9b First and/or second partial face of 9
10 Flank of 3
11 Cutting edge of 3
12 Cutting edge of 4
13 Flank of 4
14 Chisel edge
15 Extension of 9
16, 17 Lateral surface
18, 18' Planar surface
19, 19' Transition surface between 16 and 18
20 Transition edge in 9 with SS
21 Transition edge in 9 with SSB
22 Underside
23 Extension of 12
24 Face of 4
24a, 24b First and/or second partial face of 24
25, 26 Leading edge
27 Multi-purpose drilling tool
28 Boring head
29 Drill twist
30 Clamping shank
31, 32 Flute of 29
33, 34 Prolongation of 29
35 Lower region of 9 and/or 24
36 Drill tip
37 Tip
α Lip clearance angle
β Point angle
β2 Wedge angle
γ Rake angle
λ Taper angle
DN Nominal diameter of 27
E14 Plane defined by 14
E16 Plane defined by 16
EXY Plane perpendicular to 2
EXZ Transversal mid-plane
EYZ Longitudinal mid-plane
FS Edge between 13 and 16
G Outline of geometric bodies
SH Width of 1 at 7
SS Edge between 16 and 9
SSB Variation of edge between 16 and 9
SQ Width of 1 at 14
Z Intersection of 14 and 16

What is claimed is:

1. A multi-purpose drilling tool (27) with a boring head (28), a drill twist (29) connected thereto and a downstream clamping shank (30), a cutting element (1) being provided on the working side of the boring head (28), wherein the cutting element (1) has a face (9, 24), at least a portion of the face (9, 24) having a rake angle ($\gamma$) with a value of $\gamma=0°$ and with a leading edge (25) extending parallel to a longitudinal drill bit axis (2), and a lateral surface (16,17), wherein the cutting element (1) has at least one flank (10, 13) with a lip clearance angle ($\alpha$) having a value of $5° \leqq \alpha \leqq 15°$, wherein the cutting element (1) is limited laterally by two longitudinal sides (5, 6) and two transverse sides (7, 8), wherein a cutting lip (3) of cutting element (1) tapers from the transverse side (7) toward the longitudinal drill bit axis (2) from a width (SH) to a width (SQ), wherein the cutting element (1) has at least one cutting edge (11, 12) formed by the face (9, 24) and the flanks (10, 13), wherein the flanks (10, 13) meet at a chisel edge (14), said chisel edge (14) also joining the cutting edges (11, 12), and wherein the face (9) extends toward a plane (E16) of the lateral surface (16) at an acute taper angle ($\lambda$).

2. The multi-purpose drilling tool (27) as recited in claim 1, wherein the cutting edge (11, 12) is directed toward the longitudinal drill bit axis (2).

3. The multi-purpose drilling tool (27) as recited in claim 2, wherein the cutting edge (11, 12) has a shape that is selected from a curve, a zigzag, or both and approaches the longitudinal drill bit axis (2) or the longitudinal mid-plane (EYZ).

4. The multi-purpose drilling tool (27) as recited in claim 2, wherein the cutting edges (11, 12) meet to form a point angle (R) of 100° to 150°.

5. The multi-purpose drilling tool (27) as recited in claim 1, wherein the face (9, 24) forms an acute taper angle ($\lambda$) with a longitudinal mid-plane (EYZ) and transitions via a curved surface (19) into the lateral surface (16, 17).

6. The multi-purpose drilling tool (27) as recited in claim 1, wherein the lateral surface (16, 17) and the face (9, 24) meet at a straight transition edge (SS, SSB), the transition edge (SS; SSB) extending in parallel with or at an acute angle with a longitudinal drill bit axis (2).

7. The multi-purpose drilling tool (27) as recited in claim 2, wherein the cutting edge (11, 12) has an extension (15, 23) that transitions into the lateral surface (16, 17) on the other side of a transversal mid-plane (EXZ).

8. The multi-purpose drilling tool (27) as recited in claim 1, wherein the cutting element (1) is designed as a hard-metal cutting element.

9. The multi-purpose drilling tool (27) as recited in claim 1, wherein the face (9, 24) is designed as a flat surface and has a uniform rake angle ($\gamma$).

10. The multi-purpose drilling tool (27) as recited in claim 1, wherein the face (9, 24) has a first partial face (9a, 24a) with a rake angle $\gamma \geqq 0°$ and a second partial face (9b, 24b) with a negative rake angle $\gamma<0°$.

11. The multi-purpose drilling tool (27) as recited in claim 1, wherein the face (9, 24) has a negative rake angle $\gamma<0°$ close to the longitudinal drill bit axis (2).

12. The multi-purpose drilling tool (27) as recited in claim 1, wherein the face (9, 24) has a rake angle $\gamma>0°$ oriented toward transverse sides (7, 8).

13. The multi-purpose drilling tool (27) as recited in claim 1, wherein the multi-purpose drilling tool (27) is usable in a rotating and rotary-impacting manner.

* * * * *